July 1, 1941.　　　　L. J. SANTEN　　　　2,247,562
THRUSTER
Filed May 28, 1940
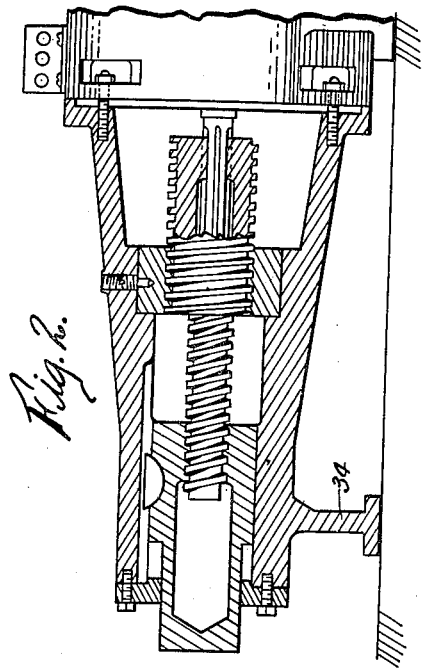
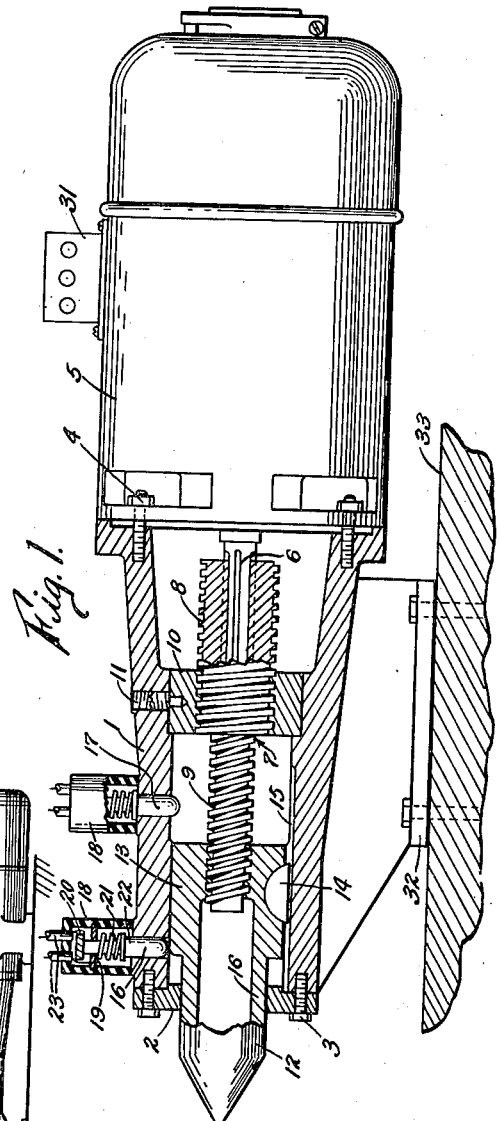
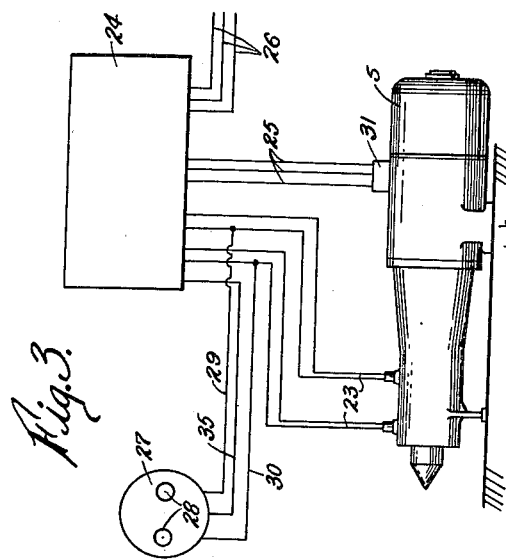
INVENTOR.
Louis J. Santen
BY
Murray, Sackhoff & Paddack
ATTORNEYS Patented July 1, 1941

2,247,562

UNITED STATES PATENT OFFICE 2,247,562

THRUSTER

Louis J. Santen, Bellevue, Ky., assignor to The B. A. Wesche Electric Company, Cincinnati, Ohio, a corporation of Ohio Application May 28, 1940, Serial No. 337,687

9 Claims. (Cl. 74—59)

This invention relates to a thruster provided with mechanical operating parts and adapted to be run by electrical power.

An object of the invention is to provide a device of this kind which may be used in any position and at any angle.

Another object is to produce a thruster adapted to be operated by relatively low power and to increase such power, as applied by the thruster, through purely mechanical means.

Another object is to provide a thruster adaptable to a wide variety of uses and which is compact and readily portable.

Another object is the provision of such a device which is highly efficient in operation, which is readily assembled and disassembled, and the operating parts of which may be readily changed for adaptation to different working requirements.

These and other objects are attained by the means described herein and illustrated in the accompanying drawing, in which:

Fig. 1 is a side view of the thruster of this invention with the mechanical or thrust portion thereof shown in cross-section and the associated electric motor shown in full.

Fig. 2 is a similar view of a modified form of the invention.

Fig. 3 is a schematic view of the thruster as seen in Fig. 1 and the electrical circuit associated therewith.

Thrusters of the kind heretofore commonly used have for the most part been of the hydraulic type, the usefulness of which is limited by the necessity of placing such thrusters in only one position, that is, so that the liquid and associated means forming parts thereof are maintained in operative relationship. Moreover, thrusters of this kind are generally large and unwieldy, more or less permanently positioned and expensive in operation and upkeep.

This invention overcomes the disadvantages mentioned by the provision of a compact thruster unit in which mechanical rather than hydraulic means are utilized and which therefore may be placed in any position desired with equal efficiency of operation. The device, moreover, is particularly adapted to be operated by a small motor so that the expense of operation and upkeep is much reduced and yet in which the applicable power produced by the thruster is sufficient for the various purposes in which devices of this kind are utilized.

It is believed unnecessary to describe in detail the numerous uses to which the thruster of this invention may be put, but generally speaking the device may be used for the application of intermittent pressures, such as in connection with chucks of all kinds; for intermittent releases, or brakes, or switches; where alternate opening and closing action of any kind is required; the movement of levers, and other uses too numerous to mention but which readily suggest themselves.

With reference to the drawing:

The thruster of this invention may comprise a generally tubular housing 1 having an open outer end upon which a centrally apertured cover 2 is secured by suitable means such as by the bolts 3. The opposite end of the housing 1 is likewise open and may have secured thereto, as at 4, a reversible electric torque motor 5. The armature 6 of this motor projects into the housing 1.

Interiorly of the said housing a shaft 7 is positioned, this shaft being formed with an enlarged section 8 provided with a relatively slow thread and with another section 9 formed with a relatively fast thread. The section 8 of this shaft is threadedly engaged by a block 10 releasably fixed within the housing by a set screw 11.

The section 9 of shaft 7 threadedly engages a chambered thrust member 12. This member is mounted for slidable, non-rotatable movement inwardly and outwardly of the housing, through the closure plate 2. The inner portion 13 of the thrust member is relatively enlarged to provide a slide fit with the adjacent interior walls of the housing 1. A key slot is formed in the side surface of the portion 13 into which an arcuate key 14 is positioned and which projects into a groove 15 provided in the adjacent inner face of the housing 1 whereby the slidable non-rotatable positioning of the thrust member is achieved.

It will be seen that the section 9 of shaft 7 is threadedly received in the rear end of the thrust member and is adapted to project into a chamber 16 formed in the latter.

It will further be seen that the enlarged section 8 of shaft 7 is fixed, by a suitable spline arrangement, upon the armature 6 of the motor.

It will now be obvious that reciprocatory rotation applied to the armature by the motor 5 results in alternate advancement and retraction of the shaft 7 which in turn results in inward and outward movement of the thrust member 12 relative to its housing. The relatively low power provided by a light motor is, by virtue of the thread differentials on sections 8 and 9 of the shaft 7, increased in a desired ratio according to the type of threaded shaft utilized and the thread relationships provided thereby. It is unnecessary here to provide the mathematical formulas setting forth any specific one of the relationships mentioned but, as to the example in Fig. 1, it may be stated generally that the enlarged size and slow thread of the section 8 of shaft 7 renders said shaft easily operated by the motor and at an increased power ratio which depends, among the other factors mentioned, upon the speed of the motor. The section 9 of the shaft, with a faster thread, provides the desired speed of reciprocation normally required in a thrust member.

In Figs. 1 and 3 the thruster is provided with reversing switches which, by way of example, may comprise a pair of spaced resilient contact fingers 16 and 17 projecting inwardly of the housing 1 and adapted to be alternately contacted by the opposite ends of the enlarged portion 13 of the thrust member for reversing the motor. Any suitable switch arrangement may be provided but, as herein shown, the said fingers 16 and 17 are each mounted in an insulating cap 18 provided interiorly with an electrical contact washer 19 through which the upper ends of the said fingers project. The upper end of each finger above the washer 19 is provided with a contact head 20 normally pressed down in electrical contact against the washer 19, by virtue of an expansion spring 21 positioned between the washer 19 and a bead 22 on the finger. The electrical leads are seen proceeding from the caps 18, at 23. By an arrangement thus described, the raising of the finger 16, for example, by contact with the adjacent part of the thrust member breaks the electrical connection at this point while the circuit is completed by the other finger 17.

A suitable electrical circuit is shown in Fig. 3 where the leads 23 referred to are shown proceeding to a control center 24. The three-phase circuit for the reversible torque motor is indicated at 25, the wires proceeding to a control box 31 on the motor 5, while the circuit wires 26 are shown proceeding to a suitable electrical source. A manual control 27 for the thrust may be provided, if desired, and may comprise a pair of push buttons 28. The circuit wires 29 and 30 for these push buttons each intercepts one of the circuit connections 23 associated with the contact fingers 16 and 17. When one or other of the push buttons 28 is operated, the circuit is completed through a neutral circuit wire 35 which cooperates either with the circuit wire 29 or 30.

In Fig. 2 the contact fingers 16 and 17 and related parts are omitted, the operation of this device depending upon other and well-known motor reversing means. The other elements of the thruster remain substantially the same, the thrust member in Fig. 2 being shown with a blunt outer end while in Fig. 1 the member is pointed, as for use with a chuck.

It will be obvious that the section of the housing 1 between the closure plate 2 and the block 10 forms an effective oil chamber so that constant lubrication for the operating parts of the device may be assured.

The thruster seen in Fig. 1 is shown as provided with a base 32 which may be secured upon a suitable support 33 for a relatively stationary positioning. In Fig. 2 the device shown is a more readily portable type, the housing here being formed with an integral foot 34 which supports the housing, after the device has been placed in a desired position and at a desired angle. The electrical motor utilized may be a quite small type such as of one-quarter horse power. For heavy service, a heavier type of motor may be utilized.

What is claimed is:

1. A thruster comprising a housing, a shaft in the housing having one section of its outer surface of relatively great diameter and formed with a relatively slow thread and another section of said surface of relatively smaller diameter formed with a relatively fast thread, a fixed block in the housing and threadedly engaging said larger section, a thrust member mounted for slidable non-rotatable movement inwardly and outwardly of said housing and threadedly engaged by said smaller shaft section, and means applying reciprocatory motion to said larger shaft section to effect said inward and outward movement of the thrust member and at an increased power ratio, by virtue of said thread differentials.

2. A thruster comprising a housing, a shaft in the housing having one section of its outer surface formed with a relatively slow thread and another section of said surface formed with a relatively fast thread, a fixed block in the housing and threadedly engaging said slow thread section, a thrust member mounted for slidable non-rotatable movement in the housing and threadedly engaged by said fast thread section of the shaft, and means applying reciprocatory motion to said slow thread section of the shaft to effect inward and outward movement of the thrust member relative to the housing and at an increased power ratio by virtue of said thread differentials.

3. A thruster comprising a housing, a shaft in the housing having one section of its outer surface formed with a relatively slow thread and another section of said surface formed with a relatively fast thread, a fixed block in the housing and threadedly engaging said slow thread section, a thrust member mounted for slidable non-rotatable movement in the housing and threadedly engaged by said fast thread section of the shaft, and means applying relatively low power reciprocatory motion to said slow thread section of the shaft to effect inward and outward movement of the thrust member relative to the housing and at an increased power ratio by virtue of said thread differentials.

4. A thruster comprising a housing, a shaft in the housing having one section of its outer surface of relatively great diameter formed with a relatively slow thread and another section of said surface of relatively smaller diameter formed with a relatively fast thread, a fixed block in the housing and threadedly engaging said larger section, a thrust member mounted for slidable non-rotatable movement inwardly and outwardly of said housing and threadedly engaged by said smaller shaft section, and means applying relatively low power reciprocatory motion to said larger shaft section to effect said inward and outward movement of the thrust member and at an increased power ratio, by virtue of said thread differentials.

5. A thruster comprising a housing, a shaft in the housing having one section of said outer surface of relatively great diameter formed with a relatively slow thread and another section of said surface of relatively smaller diameter formed with a relatively fast thread, a fixed block in the housing and threadedly engaging said larger section, a thrust member mounted for slidable non-rotatable inwardly and outwardly movement of said housing and threadedly engaged by said smaller shaft section, a relatively low power reversible torque motor having its armature connected with said slow thread section of said shaft, and means for operating and for reversing the motor to effect inward and outward movement of the thrust member relative to the housing and at an increased power ratio by virtue of said thread differentials.

6. A thruster comprising a housing, a shaft in the housing having one section of its outer surface formed with a relatively slow thread and another section of said surface formed with a relatively fast thread, a fixed block in the housing and threadedly engaging said slow thread section, a thrust member mounted for slidable non-rotatable movement in the housing and threadedly engaged by said fast thread section of the shaft, a relatively low power reversible torque motor having its armature connected with said slow thread section of said shaft, a motor circuit, and a pair of reversing switches associated with the housing and controlling the motor circuit, said shaft being actuated by the motor and said switches being alternately contacted by the shaft to effect inward and outward movement of the thrust member relative to the housing and at an increased power ratio by virtue of said thread differentials.

7. A thruster comprising a housing, a shaft in the housing having one section of its outer surface of relatively great diameter formed with a relatively slow thread and another section of said surface of relatively smaller diameter formed with a relatively fast thread, a fixed block in the housing and threadedly engaging said larger section, a thrust member mounted for slidable non-rotatable movement inwardly and outwardly of said housing and threadedly engaged by said smaller shaft section, a relatively low power reversible torque motor having its armature connected with said slow thread section of said shaft, a motor circuit, and a pair of reversing switches associated with the housing and controlling the motor circuit, said shaft being actuated by the motor and said switches being alternately contacted by the shaft to effect inward and outward movement of the thrust member relative to the housing and at an increased power ratio by virtue of said thread differentials.

8. A thruster comprising a housing, a shaft in the housing having one section of its outer surface formed with a relatively slow thread and another section of said surface formed with a relatively fast thread, a fixed block in the housing threadedly engaging one of said sections, a thrust member mounted for slidable non-rotatable movement inwardly and outwardly of the housing and threadedly engaged by the other of said threaded sections, and means operative on said first threaded section for applying alternating rotation to the shaft.

9. A thruster comprising a housing, a shaft in the housing having one section of relatively large diameter and another section of reduced diameter, both of said sections being threaded, a fixed block in the housing threadedly engaging one of said sections, a thrust member mounted for slidable non-rotatable movement inwardly and outwardly of the housing and threadedly engaged by the other of said threaded sections, and means operative on said first threaded section for applying alternating rotation to the shaft.

LOUIS J. SANTEN.

CERTIFICATE OF CORRECTION.

Patent No. 2,247,562.                                                             July 1, 1941.

LOUIS J. SANTEN.

It is hereby certified that error appears in the printed specification of the above numbered patent requiring correction as follows: Page 2, second column, line 66, claim 5, for the word "said" read --its--; and that the said Letters Patent should be read with this correction therein that the same may conform to the record of the case in the Patent Office.

Signed and sealed this 2nd day of September, A. D. 1941.

(Seal)                                                                 Henry Van Arsdale,
Acting Commissioner of Patents.